United States Patent

[11] 3,557,356

[72] Inventors Claude Balza;
Maurice Auguste Francois Joseph Maniere, Conflans-Sainte-Honorine, Yvelines, France

[21] Appl. No. 726,686
[22] Filed May 6, 1968
[45] Patented Jan. 19, 1971
[73] Assignee Lignes Telegraphiques & Telephoniques Paris, France
[32] Priority May 12, 1967
[33] France
[31] 106,302

[54] PSEUDO-RANDOM 4-LEVEL m-SEQUENCES GENERATORS
9 Claims, 1 Drawing Fig.

[52] U.S. Cl. 235/152, 328/60
[51] Int. Cl. G06f 7/38
[50] Field of Search 235/152, 197; 328/60, 61

[56] References Cited

UNITED STATES PATENTS

| | | | |
|---|---|---|---|
| 3,171,082 | 2/1965 | Dillard et al. | 328/60 |
| 3,124,753 | 3/1964 | Gieseler | 328/61 |

OTHER REFERENCES

Barter & Schneider: COMPUTATION WITH FINITE FIELDS Information & Control Vol. 6 June 1963 pp 79— 98 R & D Q350 I5

Elspas, B. THE THEORY OF AUTONOMOUS LINEAR SEQUENTIAL NETWORKS IRE Trans. Circuit Theory Vol. 6 Mar. 1959 pp 45— 60 Group 255 TK 3226 I17

*Primary Examiner*—Malcolm A. Morrison
*Assistant Examiner*—David H. Malzahn
*Attorney*—Waters, Roditi, Schwartz & Nissen

ABSTRACT: Electronic apparatus for generating pseudo-random sequences of 4-level signals, comprising combinations of electronic devices capable of simulating the two possible operations on a 4-element Galois' field. The combinations include various logic circuits of the "AND, EXCLUSIVE OR" and "INVERTER" types.

(Ap Bp) = (AB)*0

(Ap Bp) = (AB) *1

(Ap Bp) = (AB) * a (ApBp) = (AB) * b

PSEUDO-RANDOM 4-LEVEL m-SEQUENCES GENERATORS

BACKGROUND OF THE INVENTION

1. Field of the Invention

The present invention relates to electronic systems designed to generate pseudorandom sequences of signals at four levels, which systems comprise combinations of electronic devices able to simulate the two possible functions of a four-element Galois field. Devices of this sort were the subject of the French Pat. Ser. No. 1,531,465 filed on Apr. 28, 1967.

2. Description of the Prior Art

The fundamental properties of pseudorandom sequences of signals at several levels, and the description of the functional organization of systems which can be employed to generate such signal trains on the basis of the Galois group theory and primitive polynominals, have been exhaustively discussed in the book "Error-correcting codes," by W.W. Peterson, 1965 edition, published by the Massachusetts Institute of Technology, Cambridge, Massachusetts, U.S.A. These questions have been dealt with in particular detail in paragraphs 7.4, (pages 118—124) and 8.3 (page 147) of the said book.

On the other hand, technical literature provides us with a number of general and specialized studies in these areas; we can quote for example articles which have appeared in Electronics Letters, a review published by the Institution of Electrical Engineers, London, and in fact to the article by K.R. Godfrey entitled "Three level m-sequences" which appeared in the Jul. 1966 issue, volume 2, No. 7, pages 241, and also to same volume, same number, page 258, an article by J.A. Chang entitled "Generation of 5-level maximal-length sequences;" an article by M. Darnell in the November 1966 issue, volume 2, No. 11, page 428, entitled "Synthesis of pseudorandom signals derived from *p*-level *m*-sequences."

However, these documents do not specifically deal with 4-level signals.

SUMMARY OF THE INVENTION

It is an object of the present invention to create devices or systems which will generate pseudorandom sequences of 4-level signals, by physically deriving each of the four signal levels from a predetermined pair (from among the four possible pairs) of bivalent signals, and by using for that purpose implementing means which are able to simulate the operations on a 4-element Galois field by carrying out combinations of operations on a 2-element Galois field. Means of this kind are known, for example the electronic devices described in the above mentioned French Patent.

In the following, the notations CG(4) and CG(2), respectively, will be employed to designate a 4-element Galois field and a 2-element Galois field.

Definitions of two-element and four-element Galois fields are given, for instance, in the already mentioned book by W.W. Peterson, page 90, paragraph 6.4, and examples of the possible addition and multiplication operations on such fields are given in tables 2.1 and 2.3, paragraph 2.3, pages 15—16 of the same book.

The elements of the pseudorandom sequence to be generated are produced in accordance with the known principle, as successive ones of a sequence of elements of the field CG(4), which elements are indicated by the letter *a* and an associated index which signifies its position in the series:

$$h_0a_i+h_1a_{i+1}+\cdots+h_{m-1}a_{i+m-1}+a_{i+m}=0 \quad (1)$$

where $h_0$, $h_1$, ..... $h_{m-1}$, are *m* given elements of one and the same Galois field, when the *m* first elements of the sequence $a_0$, $a_1$ ....., $a_{m-1}$ are fixed; in the quoted relationship, a term such as $h_j\,a_{i+j}$ represents the product in CG(4) of the known elements $h_j$ and an unknown element $a_{i+j}$, and the + signs between the different terms illustrate the additions in CG(4) of successive terms; the indices of the *a* and *h* factors are natural whole numbers.

In accordance with the invention, the first and second signals of the said pairs of bivalent signals represent the *m* successive elements $a_i$ $a_{i+1}$ ... $a_{i+m}$ of the equation (1) and are produced in the *m* successive stages of a first and a second shift-register, these shift-registers being identical, being controlled by a common shift pulse circuit and each stage having two levels; the rank of the *m* successive stages are defined by the whole numbers $(j+1)$, $j$ varying between 0 and $m-1$.

In accordance with one essential feature, a system in accordance with the invention has a *m*-stage structure (the ranks of which stages are denoted by the whole numbers $(j+1)$, $j$ varying between 0 and $m-1$), the stage of order $(j+1)$ comprising, for values of $j$ varying between $j = 1$ to $j = (m-2)$ (i.e. this is a stage other than the first or last stages), four input terminals, a first and a second of which have applied to them a pair of signals generated in the preceding stage, four output terminals, two of which (the third and the fourth) are connected to the said first and second input terminals of the following stage (stage of order $(j+2)$ the two stages of order $(j+1)$ of said first and second shift-registers, and electronic device of known design, able to simulate the multiplication in CG(4) of element $a_{i+j}$ by element $h_j$ (the latter being the coefficient of $a_{i+j}$ in the equation (1) an electronic device of known design, able to simulate the addition in CG(4) of the element produced by the said multiplication and the element forming the sum of all the homologous "elements produced" in the preceding stages of the said system in accordance with the invention, said sum element being represented by the said pair of signals applied to the said first and second terminals of the input of said stage of order $(j+1)$ of said system, the pair of signals representing the result of the said addition being applied through the medium of the said third and fourth output terminals to the aforesaid first and second input terminals of the following stage, of order $(j+2)$, of said same system in accordance with the invention.

Other features of the systems proposed in accordance with the present invention, in particular features relating to the designs of said first and second stages, will become more clearly apparent in the course of the ensuing description, which relates to the accompanying drawings, said description and said drawings being given purely by way of nonlimitative examples.

DESCRIPTION OF PREFERRED EMBODIMENTS

In all the FIGS., the arrows indicate the direction of transmission of information.

Figure 1:
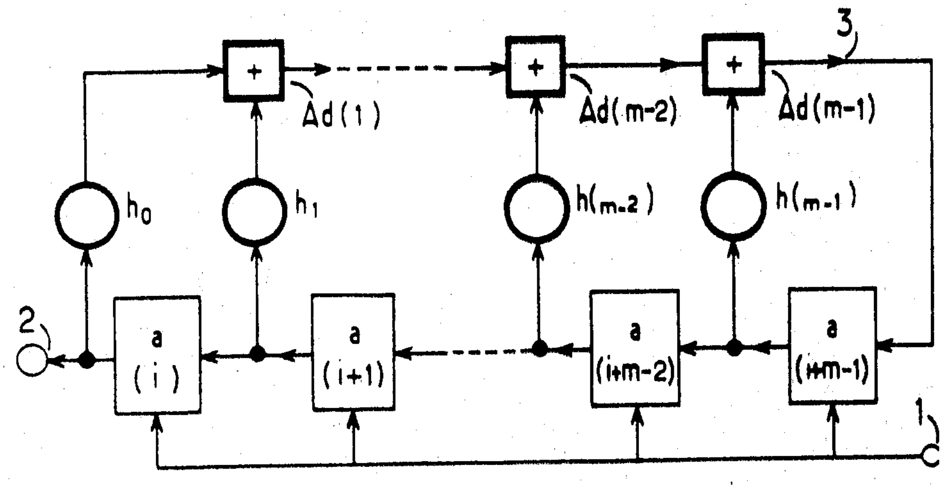
FIG. 1 illustrates symbolically a system capable of generating pseudorandom series of signals having an arbitrary number of levels.
Figure 3:
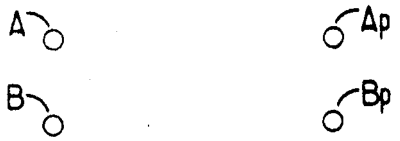
FIGS. 3, 4, 5, 6 illustrate the diagrams of electronic devices able to simulate the multiplication, in CG(4), of any element in this device by one of the known elements, 0, 1, *a*, *b*, respectively.
Figure 4:
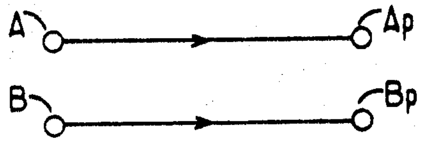
Figure 5:
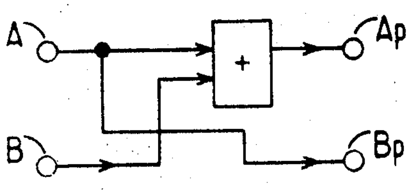
Figure 6:
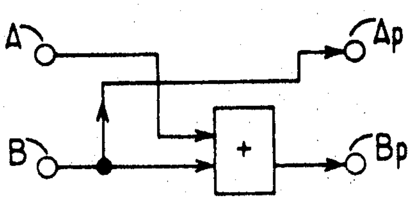
Figure 7:
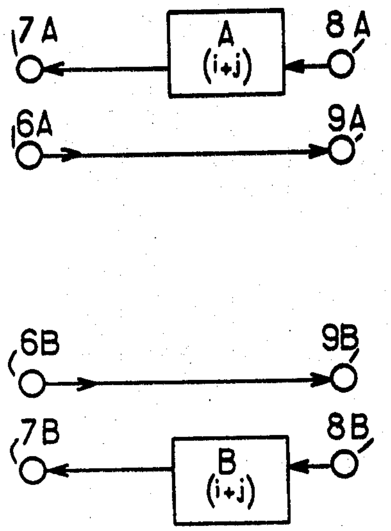
FIGS. 7, 8, 9, 10 each illustrate the block diagram of a stage in a system in accordance with the invention, for the four possible values of the corresponding coefficient *h* (with index), namely: 0, 1, *a*, *b*.

FIG. 1 is substantially a reproduction of FIG. 7.14 of the book by W. W. Peterson (edition 1965, page 118), already referred to.

The blocks containing the letter $a$ in the middle, and carrying the notations $$(i),\ (i+1),\ \ldots,\ (i+m-1)$$

symbolize the stages of a $m$-stage shift-register, each stage having a number $p$ of possible states; these $p$ states are considered as corresponding to the elements of a field with $p$ elements.

The terminal 1 enables shift pulses to be injected.

The thick-line circles with the successive designations $$h_o,\ h_1,\ \ldots\ h_{m-1}$$

each symbolize an operator which effects multiplication, in a $p$-element field, of the information arriving at this operator in accordance with the input arrow, by a known element of the same field, namely the corresponding element $h_i$.

The thick-line squares, with the + sign in the center and carrying the designations $Ad(1)$, ... $Ad(m-2)$, $Ad(m-1)$, each symbolize an operator which, in a $p$-element field, effects the addition of the two pieces of information arriving at the operator in the manner indicated by the two input arrows.

The circle 2 symbolizes the output circuit of the system illustrated, which furnishes an assembly of pieces of information corresponding to the element $a_i$ representing one of the levels of the $p$-level signal, and the line 3 symbolizes an assembly of connections via which the assembly of pieces of information corresponding to element $a_{i+m}$, is transmitted.

It will be remembered that the periodicity of a recurrent sequence defined by a series such as (1), is a whole number $n$ which satisfies the following condition:

The polynomial $X^n + 1$ is a multiple of the polynomial of X, of $m^{th}$ degree, defined by equation (2) hereinafter:

$$h(X)=h_o+h_1X+h_2X^2+\ \ldots\ +h_{m-1}X^{m-1}+X^m \qquad (2)$$

It is also known that if $m$ is given, the highest whole number $n$ corresponds to the case for which $h$ (X) is a primitive polynomial, i.e. has as its roots the primitive elements of a field; the field thus contains $p^m$ elements and the value of the whole number $n$ is $p^m-1$.

Taking the hypothesis upon which the object of the present invention is based, the whole number $p$ is equal to 4; the factors $h_j$ are known elements of CG(4), and the factors $a_i$ are any arbitrary elements of the same field; the number of possible states of the stages of the shift-register, is 4.

In FIG. 1 too, the operators (thick-line circles and squares) thus respectively symbolize the operators responsible for the multiplication and addition in CG(4), the first of the said operations being concerned with a known element and some arbitrary other element, and the second of the second operations with two arbitrary elements.

The symbolic illustration of FIG. 1 does not directly link up with a block diagram of a system based on electronic circuits for executing the stated functions. However, for example through the French patent specification already referred to, electronic devices are known which are capable of carrying out the said operations in CG(4), as symbolized in FIG. 1.

As the aforementioned French patent specification also discloses, a paired relationship is selected (from among the 24 possible ones) between the four elements of CG(4) and the four pairs of two binary elements (00), .... (01), (10), (11). In the following, the notation ($A_i$ $B_i$) has been used to indicate that of these pairs which corresponds to $a_i$, an element of CG(4); $A_i$ and $B_i$ each being one of the elements of CG(2) and each of these two binary elements being represented physically by one of the states of a bivalent signal, so that a sample $a_i$ of the 4-level signal is physically represented by the pair of bivalent signals whose states represent $A_i$ and $B_i$ respectively.

Figure 2:
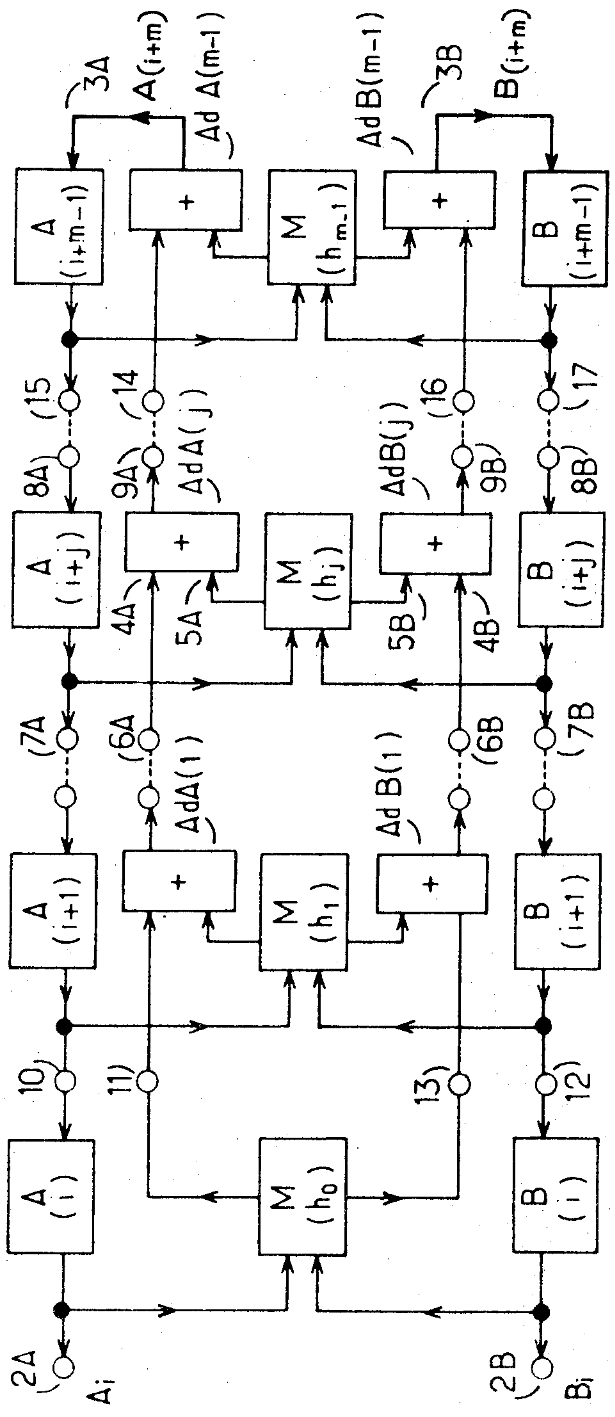
FIG. 2 illustrates the block circuit diagram of a system in accordance with the invention.

FIG. 2 illustrates the block diagram of a system in accordance with the invention. The rectangles containing the letter A at the center followed by the designations ($i$), ($i$+1), ($i$+$j$), ... ($i$+$m$−1), represent the successive stages of a first $m$-stage shift-register; the natural order of the stage ($i$+$j$) referred to, is ($i$+$j$+1), the whole number $j$ corresponding to the stages which succeed in the indicated order, having successive values of 0, 1, .. ($m$−1), for the orders 1, 2 .... $m$. Similar considerations apply to the rectangles marked B, which indicate the stages of a second shift-register, identical with the first.

In the FIG., the common circuit via which the shift pulses are fed to the shift-registers, has not been illustrated.

The rectangles with a $a$ + sign in the middle, carrying the designations $AdA(1)$, ... $AdA(j)$, ... $AdA(m-1)$, on the one hand, and $AdB(1)$, ..., $AdB(j)$, ... $AdB(m-1)$, on the other hand, represent operators in the form of "EXCLUSIVE OR" logic circuits, which bring about the physical addition in CG(2), or modulo 2 addition.

The rectangles containing the letter M in the middle, followed by the designations ($h_0$), ($h_1$), ... ($h_j$), ... ($h_{m-1}$), each represent an operator which, in CG(4), effects the multiplication of an arbitrary element (on the one hand of the $A_{i+j}$ series, and on the other of the $B_{i+j}$ series) by the successive known elements $h_0$, $h_1$, ... $h_j$, ..., $h_{m-1}$.

It will be seen that this representation is a symbolic one as far as the rectangles marked with the letter M are concerned, since this kind of operator circuit depends upon the known element in CG(4); this element is either 0, or 1, or $a$, or $b$, a $a$ and $b$ designating the nonneutral elements of the field. Later on, the four detailed diagrams corresponding to these four cases will be described.

The assembly incorporating the elements A with the ($i$+$j$) notation, the elements B with the notation ($i$+$j$), $AdA(j)$, $AdB(j)$, and the elements M with the notation ($h_j$), the electrical connections which link them, the four input terminals 6A, 8A, 6B, 8B, the four output terminals 7A, 9A, 7B, 9B, constitutes the stage of order ($j$+1) of the system in accordance with the invention as illustrated in FIG. 2. It is connected to the preceding stage through the terminals 6A, 6B, 7A, 7B and to the succeeding stage through the terminals 8A, 8B, 9A, 9B.

In this arbitrary stage, 4A and 5A are the two inputs of $AdA(j)$, and 4B and 5B, the two inputs of $AdB$ ($j$).

It will be seen that the pair of binary signals formed by the signals respectively applied to the inputs 5A and 5B, corresponds to that element of CG(4) which is produced by $h_j$ from the element $a_{i+j}$, i.e. the term of $(j+1)^{th}$ order in the series (1). The binary pair constituted by the signals arriving through the inputs 4A and 4B, corresponds to the total of the summing, in CG(4), of the homologous terms of the aforesaid product, which terms have been formed in the stages of earlier order.

The stage of first order, or first stage, in the system of the invention, shown at the left-hand in FIG. 2, contains no adding operators; the output terminals 2A and 2B of the stage are also the two output terminals of the system as a whole; the signal at 2A is in state $A_i$, the signal at 2B in the state $B_i$. The two input terminals of the stage, 10 and 12, here simultaneously serve as the two output terminals of the second stage; the two output terminals 11 and 13 simultaneously serve as the two input terminals of the second stage of the system. Via these terminals 11 and 13, there are applied to the said second stage the two signals which together correspond to the product, in CG(4), of $A_i$ and $h_0$.

The final stage of the system in accordance with the invention, shown at the right-hand of the FIG., simply has two inputs 14 and 16 and two output terminals 15 and 17; in addition, there are two internal connections in the form of the conductors 3A and 3B which, in each half of this final stage of said system, link the output of the adding operator to the input of the last stage in the shift-register.

It will be seen that the assembly of stages of the system in accordance with the invention executes the operations defined in the series (1), by furnishing to the output terminals 2A and 2B, the signals $A_i$ and $B_i$ respectively; the signals $A_{i+m}$ and $B_{i+m}$ are the one ones respectively transmitted via the conductors 3A and 3B.

Commencing from the electrical conditions hereinbefore defined, when a shift pulse is applied to the system (i.e. applied simultaneously to the two shift-registers), there respectively appear at the terminals 2A and 2B, the signals $A_{i+1}$ and $B_{i+1}$ and in the conductors 3A and 3B the signals $A_{i+m+1}$ and $B_{i+m+1}$.

The drawings of FIGS. 3, 4, 5 and 6 illustrate the design, known from the aforesaid French patent specification and the drawing associated therewith, of electronic circuits which can simulate the multiplication, in CG(4), of an arbitrary element, corresponded to by a pair (AB), by a predetermined element such as 0 (FIG. 3), or 1 (FIG. 4), or *a* (FIG. 5), or *b* (FIG. 6); the pair (A*p*B*p*) is the element produced by the operation in CG(4).

An indication of the operation carried out accompanies each figure. It will be note noticed in particular that the creation of the product by 0 is characterized by the absence of any electrical connections; the creation of the product by 1 is characterized by two direct electrically conductive connections.

The devices producing the product by *a* or *b*, are characterized by the presence of an "EXCLUSIVE OR" logic circuit connected in two different ways corresponding to each of these cases.

FIGS. 7, 8, 9, 10 each illustrate the detailed diagram of an arbitrary stage in a device in accordance with the invention, where the corresponding coefficient $h_j$ in the series (1) is either the element 0 or the element 1 or the element *a* or the element *b*, respectively. In each figure, the four input terminals and the four output terminals, have been shown; in the four figures, the number and numbering used in FIG. 2 has been repeated, and the input and output terminals have been distinguished by the directions of the associated arrows.

In FIG. 7, the stage contains no "OR-EXCLUSIVE" circuit; the operator M $(h_j)$ *is lacking and the operators Ad*A(*j*) and *Ad*B(*j*) therefore have only one active input and are consequently inoperative.

Figure 8:
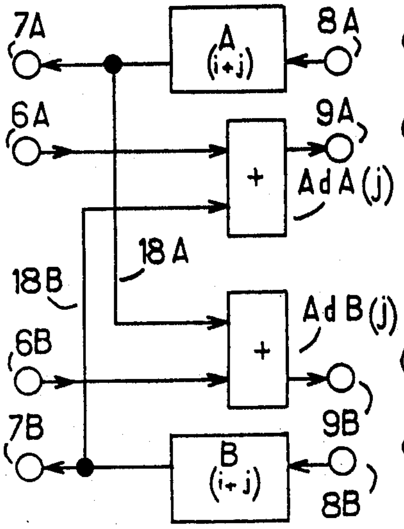

In FIG. 8, the operator M$(h_j)$ is constituted by the assembly of direct links constituted by the conductors 18A, 18B.

Figure 9:
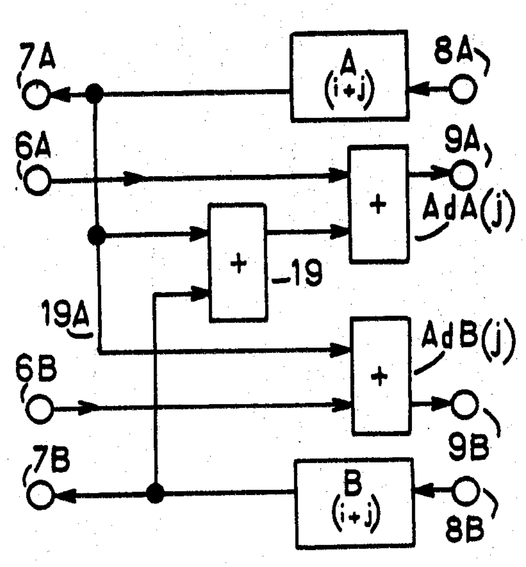

In FIG. 9, the operator M$(h_j)$ is con constituted by the "EXCLUSIVE OR" circuit 19 and the direct link formed by the conductor 19A.

Figure 10:
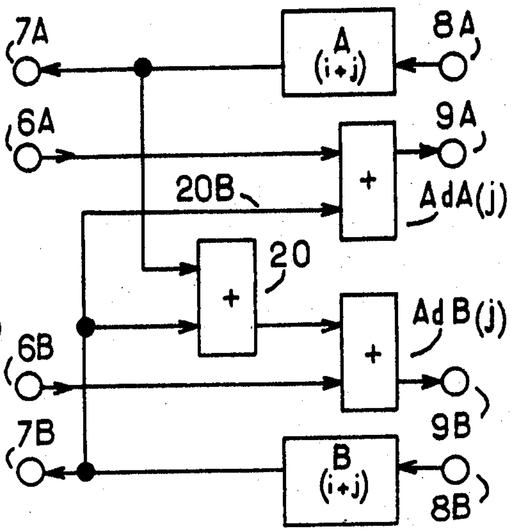

In FIG. 10, the operator M$(h_j)$ is constituted by the "EXCLUSIVE OR" circuit 20 and the direct link is in the form of the conductor 20B.

By way of a nonlimitative example, a description will now be given of a system in accordance with the invention, designed especially for the case in which *m* is equal to 4.

The pseudorandom sequence corresponding to this has 256 elements. Special values will also be selected for the coefficients *h*, namely:

$$h_0=a \qquad h_1=1 \qquad h_2=0 \qquad h_3=1$$

This gives the series $$a_i+a_{i+1}+a_{i+3}+a_{i+4}=0$$

and the polynomial of X is $$h(X)=a+X+X^3+X^4$$

Figure 11:
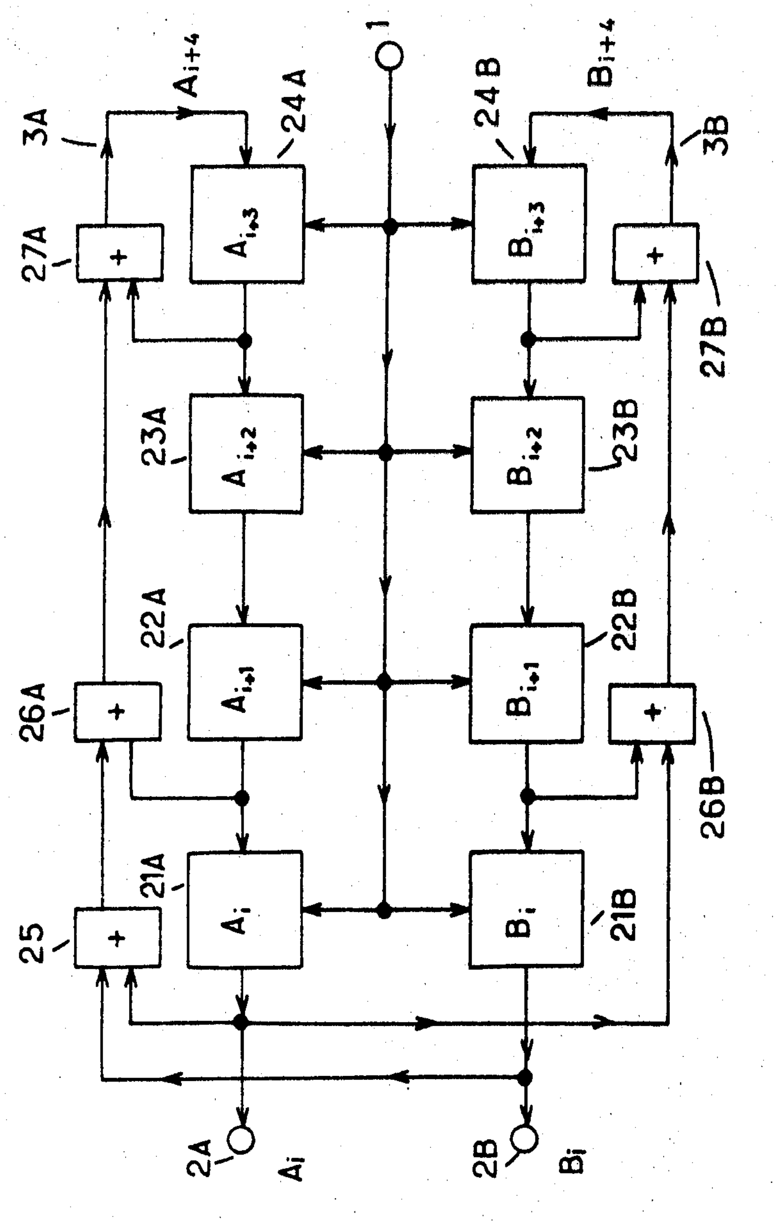
FIG. 11 illustrates the block diagram of a system in accordance with the invention, of special design.

FIG. 11 illustrates the block diagram of this system.

The terminal 1 can be used for the simultaneous application of shift pulses to the two shift-registers.

The four stages of the first shift-register are marked 21A, 22A, 23A, 24A and those of the second shift-register 21B, 22B, 23B, 24B. Each block has inscribed in it the state of the corresponding stage (expressed as $A_i$ or $B_i$).

The "EXCLUSIVE OR" circuit 25 figures in the first stage, this circuit being responsible for the multiplication by *a*; the other "EXCLUSIVE OR" circuits 26A, 26B; 27A, 27B, act as adding operators.

The output terminals 2A and 2B respectively produce the series of signals $A_i$ and $B_i$; the two notations are marked to one side of these terminals.

The conductor 3A transmits the information $A_{i+4}$ and the conductor 3B the information $B_{i+4}$.

It must be noted that the above-given examples of embodiment of the invention do not involve any limitation of the scope thereof. In particular, the respective values of the *h* coefficients in the primitive polynomial depend on the choice of said polynomial, and it is well known that, for any value of *m*, there exist several such polynomials. Consequently, to each value of *m*, there corresponds a plurality of possible devices, all or part of the stages of same rank of which may be structurally different.

Moreover, the constitution of the four circuits shown in FIGS. 3, 4, 5 and 6 are those suitable for a determined correspondence relationship among the 24 possible ones described in the above-cited French patent. Selecting one of these correspondence relationships, the respective constitutions of the corresponding four circuits may accordingly differ from the above-described ones. When the primitive polynomial *h* (X) has been selected, a plurality of possible structures still exists for the various stages of the corresponding devices.

The various embodiments forming the just-mentioned pluralities are also within the scope of the invention.

We claim:

1. Pseudorandom multilevel signal generating apparatus having a first and a second utilization terminal and comprising a number *m* of apparatus stages having respective ranks $(j+1)$, where *j* varies from zero to $(m-1)$, in which:

each of said apparatus stages having a rank differing from 1 has a first, a second, a third and a fourth input and a first, a second, a third and a fourth output;

the apparatus stage of rank 1 has a first and a second input and a first, a second, a third and a fourth output and a said stage of rank 1 is provided with direct connections connecting its first and second outputs with said first and second utilization terminals;

each of said apparatus stages having a given rank other than 1 is provided with direct connections respectively connecting its first and second outputs and its third and fourth inputs with the first and second inputs and the third and fourth outputs of the apparatus stage of immediately lower rank than said given rank;

the apparatus stage of rank *m* is also provided with direct connections respectively connecting its first and second inputs with its third and fourth outputs;

each of said apparatus stages having any rank $(j+1)$ comprises the two stages having same said rank $(j^1)$ of a first and a second shift registers each having *m* register stages and both of which are driven from a common shift pulse source, while the inputs of said register stages of rank $(j+1$ in said first and second registers respectively constitute the above said first and second inputs of said apparatus stage of same rank $(j+1)$, and while the outputs of same said register stages of rank $(j+1)$ in said first and second registers respectively constitute the above said first and second outputs of said apparatus stage of rank $(j+1)$;

said apparatus further comprising in each one of rank $(j+1)$ of said apparatus stages an electronic multiplication and addition means having a first and a second input respectively fed from said first and second outputs of same said stage of rank $(j+1)$ and having a first and a second output respectively constituting said third and fourth outputs of same said stage of rank $(j+1)$ and further having except in stage of rank 1 a third and a fourth input respectively constituting said third and fourth inputs of same said stage of rank $(j+1)$; said electronic means effecting the multiplication in a four-element field constituted by the four existing pairs of electric signals each comprising a first and a second signal having either of two possible values, said field corresponding element by element to a standard Galois' field with elements designated as 0, 1, a, b, the first two of which being of which being respectively additive and multiplicative identity elements, and a conventional correspondence between respective elements of said field and said standard Galois' field being previously chosen, said multiplication in said Galois' field applying to an undetermined one of said four signal pairs, designated as $a_{i+j}$, and to a selected coefficient $h_j$ equal to a predetermined one among said elements 0, 1, a, b, said first and second signal of said pair $a_{i+j}$ respectively appearing at said first and second outputs of said apparatus stage of rank $(j+1)$ and being applied at said first and second input of said electronic means, and said electronic means thereafter effecting the addition in same said Galois' field of the pair of signals resulting of said multiplication to a pair of a first and a second signal respectively applied to said third and fourth inputs of same said stage of rank $(j+1)$ and delivering a new signal pair resulting from said addition in same said Galois' field, said first and second signals of said new signal pair appearing respectively at said third and fourth outputs of latter said stage; and whereby there is obtained at said third and fourth output of said apparatus stage of rank $m$ a new signal pair $a_{i+m}$ defined by the recurrent relationship in said Galois' field:

$$h_0a_i+h_1a_{i+1}+\ldots+h_ja_{i+j}+\ldots+h_{m-1}a_{i+m-1}+a_{i+m}=0$$

and whereby there is obtained said signal pair $a_{i+1}$ at said first and second utilization terminals, and another new signal pair $a_{i+m+1}$ at said third and fourth outputs of same said stage of rank $m$, after said first and second shift registers both have been driven by a further shift pulse.

2. Apparatus as claimed in claim 1 having its stage of rank 1 for which said selected coefficient is equal to said element $b$ and in which said electronic means includes one "EXCLUSIVE OR" logic circuit having a first and a second input and one output, a direct connection between said first input of said electronic means and first input of said logic circuit, direct connections between said second input of said electronic means and respectively first output of said electronic means and second input of said logic circuit and a direct connection between said output of said logic circuit and said second output of said electronic means.

3. Apparatus as claimed in claim 1 having its stage of rank 1 for which said selected coefficient is equal to said element 1 and in which said electronic means includes a direct connection between its first input and first output and a direct connection between its second input and second output.

4. Apparatus as claimed in claim 1 having its stage of rank 1 for which said selected coefficient is equal to said element $a$ and in which said electronic means includes one "EXCLUSIVE OR" logic circuit having a first and a second input and one output, direct connections between said first input of said electronic means and respectively first input of said logic circuit and second output of said electronic means, a direct connection between second input of said electronic means and second input of said logic circuit and a direct connection between said output of said logic circuit and said first output of said electronic means.

5. Apparatus as claimed in claim 1, for which said previously chosen conventional correspondence is characterized as follows, letters Z and U designating above said two possible values of said first and second signals of said signal pairs, first letter meaning "zero" or absence of signal and the second one meaning "unity" or presence of signal:

(ZZ) pair is corresponding to said element 0,
(UU) pair is corresponding to said element 1,
(ZU) pair is corresponding to said element $a$,
(UZ) pair is corresponding to said element $b$.

6. Apparatus as claimed in claim 5 including at least one of its stages having rank other than 1 for which said selected coefficient is equal to said element 0 and in which said electronic means includes no connection between its first and second inputs and its other inputs and its outputs, a direct connection between its third input and first output and a direct connection between its fourth input and second output.

7. Apparatus as claimed in claim 5 including at least one of its stages having a rank differing from 1 for which said selected coefficient is equal to said element 1 and in which said electronic means includes a first and a second "EXCLUSIVE OR" logic circuit each one having a first and a second input and one output, a direct connection between first input of said electronic means and first input of said second logic circuit, a direct connection between second input of said electronic means and second input of said first logic circuit, a direct connection between third input of said electronic means and first input of said first logic circuit, a direct connection between fourth input of said electronic means and second input of said second logic circuit, a direct connection between said output of said first logic circuit and first output of said electronic means and a direct connection between said output of said second logic circuit and second output of said electronic means.

8. Apparatus as claimed in claim 7 including one of its stages having a rank differing from 1 for which said selected coefficient is equal to said element $a$ and in which said electronic means includes a third, a fourth and a fifth "EXCLUSIVE OR" logic circuit each one having a first and a second input and one output, direct connections between first input of said electronic means and respectively first input of said third and fifth logic circuits, a direct connection between second input of said electronic means and a second input of said third logic circuit, a direct connection between third input of said electronic means and first input of said fourth logic circuit, a direct connection between fourth input of said electronic means and second input of said fifth logic circuit, a direct connection between said output of said third logic circuit and a second input of said fourth logic circuit, a direct connection between said output of said fourth logic circuit and first output of said electronic means and a direct connection between said output of said fifth logic circuit and second output of said electronic means.

9. Apparatus as claimed in claim 8 including one of its stages having a rank differing from 1 for which said selected coefficient is equal to said element $b$ and in which said electronic means includes a sixth, a seventh and an eighth "EXCLUSIVE OR" logic circuit each one having a first and a second input and one output, direct connections between second input of said electronic means and respectively second input of said sixth and said seventh logic circuits, a direct connection between first input of said electronic means and first input of said sixth logic circuit, a direct connection between third input of said electronic means and first input of said seventh logic circuit, a direct connection between fourth input of said electronic means and second input of said eighth logic circuit, a direct connection between said output of said sixth logic circuit and first input of said eighth logic circuit, a direct connection between said output of said seventh logic circuit and said first output of said electronic means and a direct connection between said output of said eighth logic circuit and said second output of said electronic means.